(12) United States Patent
Baker (10) Patent No.: US 11,270,188 B2
(45) Date of Patent: Mar. 8, 2022

(54) JOINT OPTIMIZATION OF ENSEMBLES IN DEEP LEARNING

(71) Applicant: D5AI LLC, Maitland, FL (US)

(72) Inventor: James K. Baker, Maitland, FL (US)

(73) Assignee: D5AI LLC, Maitland, FL (US)

( * ) Notice: Subject to any disclaimer, the term of this patent is extended or adjusted under 35 U.S.C. 154(b) by 0 days.

(21) Appl. No.: 16/619,516

(22) PCT Filed: Sep. 26, 2018

(86) PCT No.: PCT/US2018/052857
§ 371 (c)(1),
(2) Date: Dec. 5, 2019

(87) PCT Pub. No.: WO2019/067542
PCT Pub. Date: Apr. 4, 2019

(65) Prior Publication Data
US 2020/0210812 A1    Jul. 2, 2020

Related U.S. Application Data (60) Provisional application No. 62/696,063, filed on Jul. 10, 2018, provisional application No. 62/564,754, filed on Sep. 28, 2017.

(51) Int. Cl.
*G06N 3/04* (2006.01)
*G06N 3/08* (2006.01)
(52) U.S. Cl.
CPC ......... *G06N 3/0454* (2013.01); *G06N 3/082* (2013.01); *G06N 3/084* (2013.01)

(58) Field of Classification Search
CPC ....... G06N 3/0454; G06N 3/082; G06N 3/084
See application file for complete search history.

(56) References Cited

U.S. PATENT DOCUMENTS

| | | |
|---|---|---|
| 2014/0358828 A1 | 12/2014 | Phillipps et al. |
| 2015/0161522 A1 | 6/2015 | Saon et al. |
| 2016/0155049 A1* | 6/2016 | Choi ................. G06N 3/084 706/16 |
| 2016/0358070 A1* | 12/2016 | Brothers .......... G06N 3/0454 |
| 2017/0024642 A1* | 1/2017 | Xiong .............. G06N 3/0454 |

(Continued)

FOREIGN PATENT DOCUMENTS

| | | | |
|---|---|---|---|
| WO | WO 2017/122785 A1 | 7/2017 | |
| WO | WO 2018/175098 A1 | 9/2018 | |

(Continued)

OTHER PUBLICATIONS

International Search Report and Written Opinion of the International Searching Authority for International Application No. PCT/US2018/052857 dated Nov. 26, 2018.

*Primary Examiner* — Omar F Fernandez Rivas
*Assistant Examiner* — Selene A. Haedi
(74) *Attorney, Agent, or Firm* — K&L Gates LLP (57) ABSTRACT

Computer-implemented, machine-learning systems and methods relate to a combination of neural networks. The systems and methods train the respective member networks both (i) to be diverse and yet (ii) according to a common, overall objective. Each member network is trained or retrained jointly with all the other member networks, including member networks that may not have been present in the ensemble when a member is first trained.

48 Claims, 5 Drawing Sheets

(56) References Cited

U.S. PATENT DOCUMENTS

| | | | | |
|---|---|---|---|---|
| 2017/0132528 | A1* | 5/2017 | Aslan | G06N 20/00 |
| 2019/0012594 | A1* | 1/2019 | Fukuda | G06N 3/0454 |
| 2019/0095798 | A1 | 3/2019 | Baker | |
| 2019/0095805 | A1* | 3/2019 | Tristan | G06N 20/00 |

FOREIGN PATENT DOCUMENTS

| | | |
|---|---|---|
| WO | WO 2018/194960 A1 | 10/2018 |
| WO | WO 2018/226492 A1 | 12/2018 |
| WO | WO 2018/226527 A1 | 12/2018 |
| WO | WO 2018/231708 A2 | 12/2018 |
| WO | WO 2019/005507 A1 | 1/2019 |
| WO | WO 2019/005611 A1 | 1/2019 |
| WO | WO 2019/067236 A1 | 4/2019 |
| WO | WO 2019/067248 A1 | 4/2019 |
| WO | WO 2019/067281 A1 | 4/2019 |
| WO | WO 2019/067542 A1 | 4/2019 |
| WO | WO 2019/067831 A1 | 4/2019 |
| WO | WO 2019/067960 A1 | 4/2019 |
| WO | WO 2019/152308 A1 | 8/2019 |

\* cited by examiner

JOINT OPTIMIZATION OF ENSEMBLES IN DEEP LEARNING

PRIORITY CLAIM

The present application is a national stage application under 35 U.S.C. § 371 of PCT application Serial No. PCT/US18/52857, filed Sep. 26, 2018, which claims priority to both (i) U.S. provisional patent application Ser. No. 62/564,754, entitled "Aggressive Development with Cooperative Generators," filed Sep. 28, 2017, and (ii) U.S. provisional patent application Ser. No. 62/696,063, entitled "Joint Optimization of Ensembles in Deep Learning," filed Jul. 10, 2018, both of which are incorporated herein by reference in their entirety.

BACKGROUND

Figure 5:
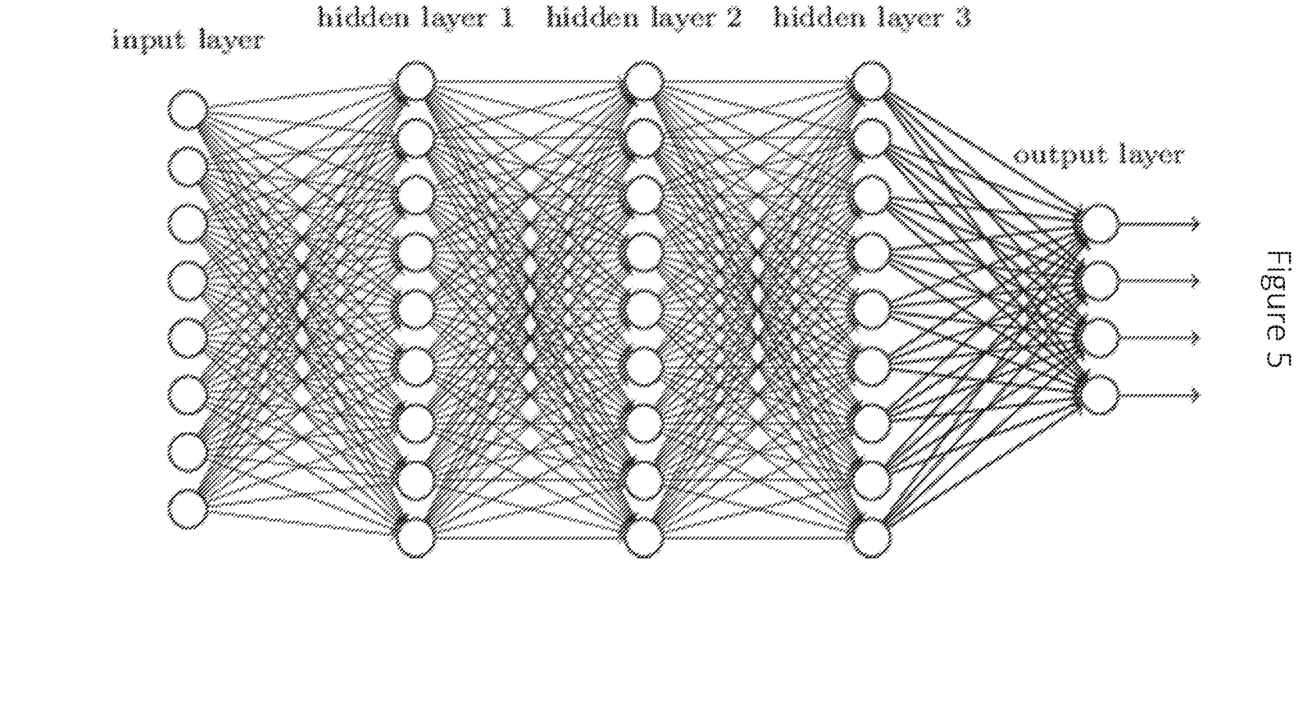
FIG. 5 is a diagram of an example neural network.

A neural network (also called an "artificial neural network") may be represented by a directed graph, which may be organized into layers, such as shown in FIG. 5. A neural network graph comprises an input layer, an output layer, zero or more inner layers (also called "hidden" layers), and weighted directed arcs. Each directed arc connects a first node, call its source node, to a second node, called its destination node. The weight of a directed arc represents the strength of the connection from its source node to its destination node. The example neural network shown in FIG. 5 has an input layer, an output layer, and three hidden layers. It is a fully connected network. That is, each node except the output nodes is connected to each of the nodes in the next layer above.

The weight associated with a directed arc in a neural network is called a "learned" parameter (also called a "trainable" parameter). A node in a neural network may also be associated with an additional learned parameter, which is called the "bias" of the node. In the process of training a neural network (also called the "learning" process), the values of the learned parameters are iteratively updated to find values that attempt to optimize a specified objective. The objective may be represented by specified target values for some or all the output nodes for each item of training data. Numerically, the objective may be represented by an error or "cost" function that is based on the difference between the specified target values and the actual values for the output nodes for an item of training data. Other parameters, called "hyperparameters" may be used to initialize the learned parameters or to help control the learning process.

An "ensemble" of machine learning systems is a plurality of machine learning systems, such as neural networks, where the plurality of machine learning systems together solve a problem. Each ensemble member typically implements a separate model and the ensemble typically combines the outputs of the separate ensemble members in some manner of voting or averaging of the member output to produce a desired output for the ensemble. Frequently, an ensemble of machine learning systems performs better than any individual ensemble member because the various errors of the systems average out.

SUMMARY

In one general aspect the present invention is directed to computer-implemented, machine-learning systems and methods related to a combination of neural networks (such as, but not necessarily, an ensemble of neural network members). The systems and methods train the respective member networks both (i) to be diverse and yet (ii) according to a common, overall objective. Each member network is trained or retrained jointly with all the other member networks, including member networks that may not have been present in the ensemble when a member is first trained. As a general tendency, the greater the diversity among the ensemble members the better the performance of the ensemble will be. These and other benefits of the present invention will be apparent from the description that follows.

FIGURES

Various embodiments of the present invention are described herein in connection with the following figures, wherein.

DETAILED DESCRIPTION

Figure 1:
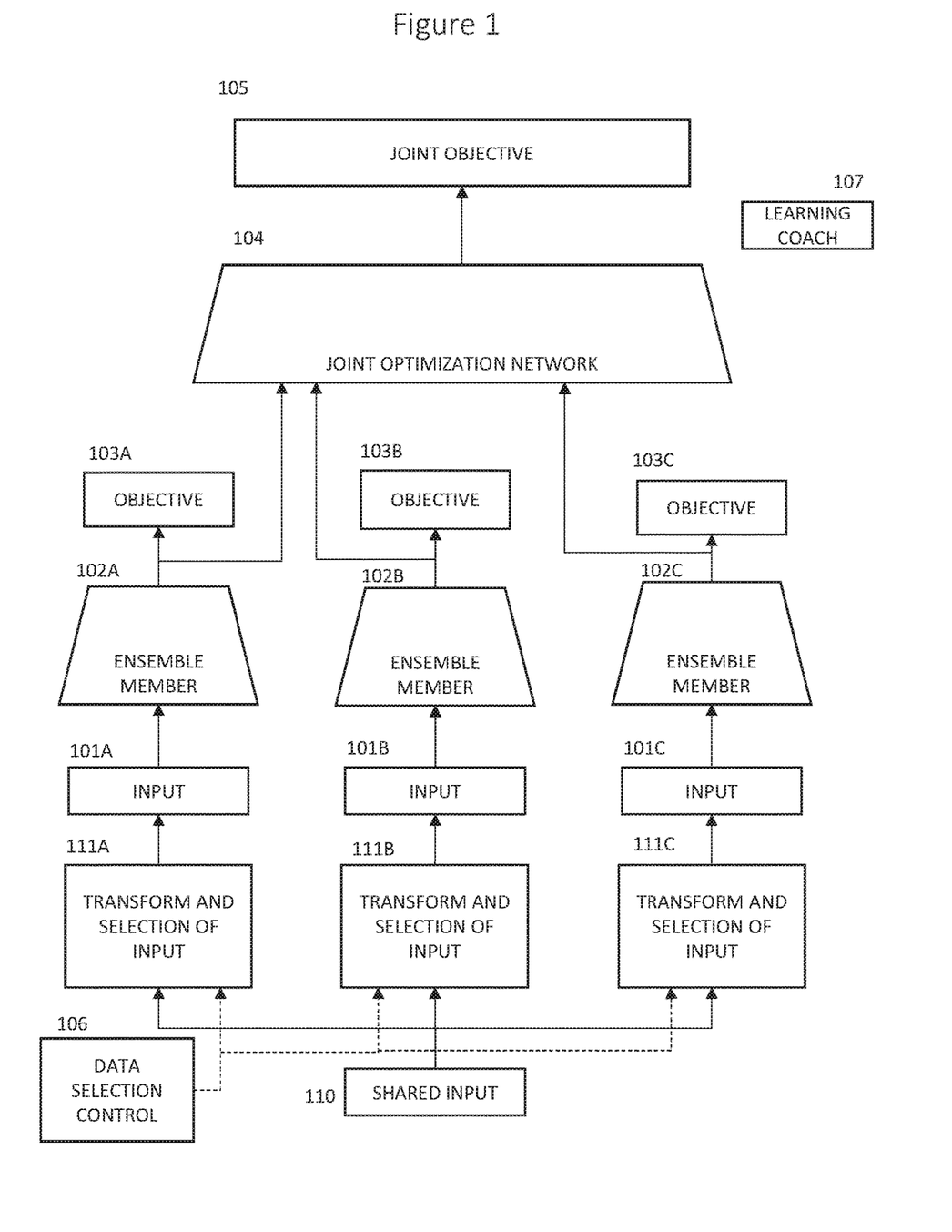
FIGS. 1 and 4 are diagrams of network systems according to various embodiments of the present invention.

In one aspect, FIG. 1 depicts a combined machine-learning system comprising an ensemble of machine-learning systems 102A-C and a joint optimization network 104, in which the members of the ensemble are neural networks trained to optimize a joint objective from the joint optimization network 104. Each member 102A, 102B, 102C of the ensemble illustrated in FIG. 1 is a neural network that has been pre-trained or that may be trained to optimize its individual objective 103A, 103B, or 103C, respectively, for a specified set of input values 101A, 101B, or 101C, respectively. In some embodiments, each of the neural networks 102A-C is merely initialized, e.g. with random weights. Initialization of a neural network with random weights is well-known to those skilled in the art of training neural networks. Although, three ensemble members 102A-C are shown in FIG. 1, there may be any number of ensemble members. The joint optimization network 104 is also a neural network, with a joint objective 105.

The arrows in FIG. 1 show the direction of a computation called feed forward activation, which is explained below. Another computation called back propagation proceeds in the direction opposite to the direction of the arrows. Feed forward activation and back propagation are well-known to those skilled in the art of training neural networks.

Figure 2:
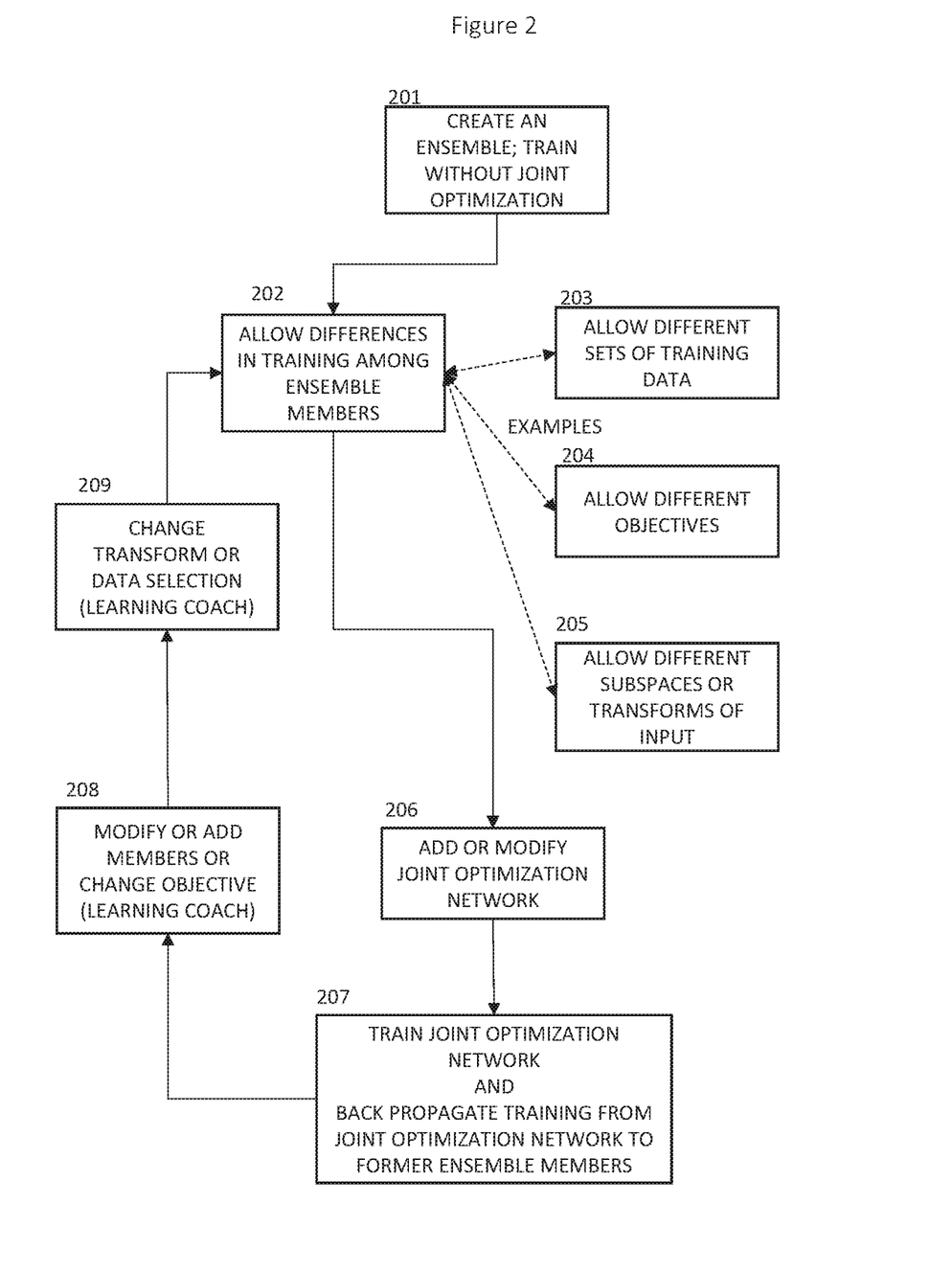
FIG. 2 is a process for training the network systems shown in FIGS. 1 and 4 according to various embodiments of the present invention.

As an illustrative embodiment, the system illustrated in FIG. 1 may be trained by the process illustrated in FIG. 2. The system illustrated in FIG. 1 and the training process of FIG. 2 may be implemented with a computer system, as described in more detail below in connection with FIG. 3.

In another aspect of the invention, the embodiment illustrated by the system shown in FIG. 1 and the process shown in FIG. 2 are more general than the illustrated application to ensembles. As will be explained in association with FIG. 4, the model of FIG. 1 and the process of FIG. 2 can also be used to build a combined network out of any set of neural networks that have or that may be given a joint objective even though they have different individual objectives. Thus, this aspect of the invention does not apply just to a set of networks that are the members of an ensemble. This generalization also facilitates additional optimizations for ensembles, as will be discussed in association with Block 204 of FIG. 2.

A learning coach 107 and a data selection control 106 support the process of training the system illustrated in FIG. 1. They will be discussed in association with FIG. 2 and FIG. 4.

A significant property of the embodiment illustrated in FIG. 1 is that it represents both an ensemble of neural networks that each have their own individual objective 103A-C and an overall, combined network with a joint objective 105. More specifically, each ensemble member 102A-C is trained simultaneously by back propagation from its individual objective 103A-C and by back propagation from the joint optimization network 104. Unlike some other ensemble training systems, the embodiment illustrated in FIG. 1 is specifically designed for training ensembles of neural networks and assumes each ensemble member is capable of being trained by back propagation of partial derivatives of an objective function. For example, the embodiment illustrated in FIG. 1 does not apply to an ensemble of decision trees.

An example of a neural network is shown in FIG. 5. The example network shown in FIG. 5 is a feed forward network. Feed forward neural networks are discussed in more detail below. Like the arrows in FIG. 1, the arrows in FIG. 5 point in the direction of the feed forward activation computation.

In various embodiments of the invention, an objective for an individual ensemble member, such as the objective 103A for the ensemble member 102A, may be different from the joint objective 105 and may be different from the objective of another individual ensemble member, such as the objective 103B for the ensemble member 102B, and so on. This allowed difference is used in example 204 of FIG. 2. It is this property that enables the system of FIG. 1 and the training process of FIG. 2 to be applied to any set of neural networks with a joint objective, as described in connection with FIG. 4.

Also, in various embodiments of the invention, the set of input training data items 101A-C may be different for different ensemble members 102A-C. For example, the set of input training data items 101C for the ensemble member 102C may be different from the set of input training data items 101B for the ensemble member 102B, and so on. This allowed difference is used in the example 203 of FIG. 2.

Furthermore, the set of input variables may be different for different ensemble members. For example, the set input variables in the input 101A for the ensemble member 102A may comprise input variables that are not available to the ensemble member 102B from the input 101B, and so on. This allowed difference is used in example 205 of FIG. 2.

More generally, in some embodiments, optional transformations and data item selection may be applied by data item transformation and selection blocks 111A, 111B, and 111C, respectively. The operations of the data item transformation and selection blocks 111A, 111B, and 111C may be different from each other. The example of the previous paragraph, i.e., reducing the number of input variables, is a projection transformation, which is therefore a special case of the kind of transformation that can be implemented by the data item transformation and selection blocks 111A, 111B, and 111C, in embodiments in which those blocks are implemented. The differences allowed in training individual ensembles members using these transformation blocks are also examples of step 205 of FIG. 2.

As mentioned above, hyperparameters for the networks are not learned or trainable parameters. According to various embodiments, hyperparameter values for the networks 102A-C, 104 may be set by the system designer or may be controlled by a second machine learning system, called a "learning coach," which will be discussed more below. A learning coach is shown as block 107 in FIG. 1.

Any directed graph for which there is no sequence of directed arcs connecting a node back to itself is called a "directed acyclic graph" (DAG). For any directed acyclic graph, it is always possible to number the nodes such that, for every directed arc in the graph, the source node of the directed arc has a lower number than the destination node. When more than one node has the same number, the set of nodes with a given associated number is called a "layer". For a directed acyclic graph, it is always possible to associate each node with a number representing its layer such that each directed arc goes from a source node in a lower numbered layer to a destination node in a higher numbered layer. Thus, each directed acyclic graph may be associated with a layered neural network. Generally, there may be more than one way to number a specified directed acyclic graph as a layered neural network. Any node in a directed acyclic graph which is not the destination node for any directed arc is an input node. Preferably, in a neural network, the input nodes are in a single layer, i.e., the input layer. Any node which is not a source node for any directed arc is an output node. In some embodiments, the output nodes may also all be in a single layer, i.e., the output layer. However, in embodiments the invention disclosed herein, a node in an inner layer of a neural network may also be an output node. For example, in the system illustrated in FIG. 1, the nodes that were output nodes for an individual ensemble member 102A-C are still regarded as output nodes, since they are still directly connected to the individual objective 103A-C. However, in the combined network they are in an inner layer, positioned below the joint optimization network 104.

In an artificial neural network, each node represents a simplified model of a neuron. In this simplified model, for a given state of the network, each node has an associated value, called its "activation" value, in analogy with the degree of activation of a neuron in a nervous system based on the activation of other neurons and the strengths of their synaptic connections to the first neuron. The activation value of each node in the input layer is the value of the corresponding input variable.

Let each node in a neural network be associated with a unique number and in this discussion let the node be represent by its associated number. Let j represent the neuron associated with the number j. Let $S(j)=\{i(j,1), i(j,2), i(j,3), \ldots, i(j,K)\}$ be the set of nodes in the neural network for which there is a directed arc from node $i(j,k)$ to node j. The set $S(j)$ is called herein the "source set" for node j. Let $w(i,j)$ be the weight associated with the directed arc from node i node to j, where i is in $S(j)$. Generally, the activation value $A(j, D)$ for node j for a given data item D is a function of the activation values of the nodes in $S(j)$ and the weights of the connecting arcs, as indicated in the following equation:

$$A(j,D)=f(A(i(j,1),D),A(i(j,2),D), \ldots ,A(i(j,k),D),w(i(j,1),j),w(i(j,2),j), \ldots ,w(i(j,k),j)) \quad (1)$$

Often the formula for the activation value of a node in a neural network takes the form of a linear weighted sum of the activations of its source set followed by a non-linear function of a single variable, the weighted sum. That is, it takes the form:

$$A(j,D)=g(\Sigma_k w(i(j,k),j)*A(i(j,k),D)+b(j)) \quad (2)$$

The function A(j, D)=g(x) is called the "activation function" of node j. The additive constant b(j) is called the "bias" of node j. Like the connection weight associated with each directed arc, the bias of each node is a learned parameter. However, the bias(j) of node j does not depend on the data item D.

An example of an activation function is the sigmoid function (also called the logistic function):

$$g(x)=1/(1+\exp(-x)). \tag{3}$$

Another example of a common activation function is the rectified linear unit function (ReLU):

$$g(x)=\max(0,x). \tag{4}$$

A neural network for which the associated directed graph is acyclic is called a "feed forward" network. For an input data item D, it is possible to compute the activation value of each node in the network in a feed forward computation that starts with the input layer, whose activation values are set by the input data D, through the other layers of the network in numerical order. Because each source node i in S(j) is in a lower-numbered layer than the node j, the functions defined in any of the equations above may be evaluated for node j, and then for each higher numbered node in turn.

A neural network for which the associated directed graph is not acyclic is called a "recurrent" network. The activation values for the nodes in a recurrent neural network R cannot be computed directly by simply using the feed forward computation in the equations in the previous paragraphs, because a node j may have a source node i that is in a higher layer, or i may be a node that is in the same layer as node j for which A(i, D) has not yet been evaluated. For example, this condition is true for node j itself. If any node in a network has directed arc going back to itself, the network is a recurrent neural network. A workaround for this problem in computing the feed forward activation is to unroll the recurrent network R into a set of connected feed forward networks, RF={Rf(1), Rf(2), . . . , Rf(T))}. Each feed forward network Rf(t) is a modified copy of recurrent network R. The modification is that any directed arc in R from a node i to and node j for which i>j is replaced by an arc from node i in feed forward network Rf(t), for each value of t, to node j in feedforward network Rf(t+1). The set of connected networks {Rf(t)} then forms a single feed forward network RF. The feed forward activation computation for the unrolled network RF is a finite approximation to the solution to the recursive equations defining the activation of the recurrent network R. With this unrolling, the systems illustrated in FIG. 1 and FIG. 4 can represent ensembles or sets of recurrent neural networks as well as feed forward networks.

Figure 3:
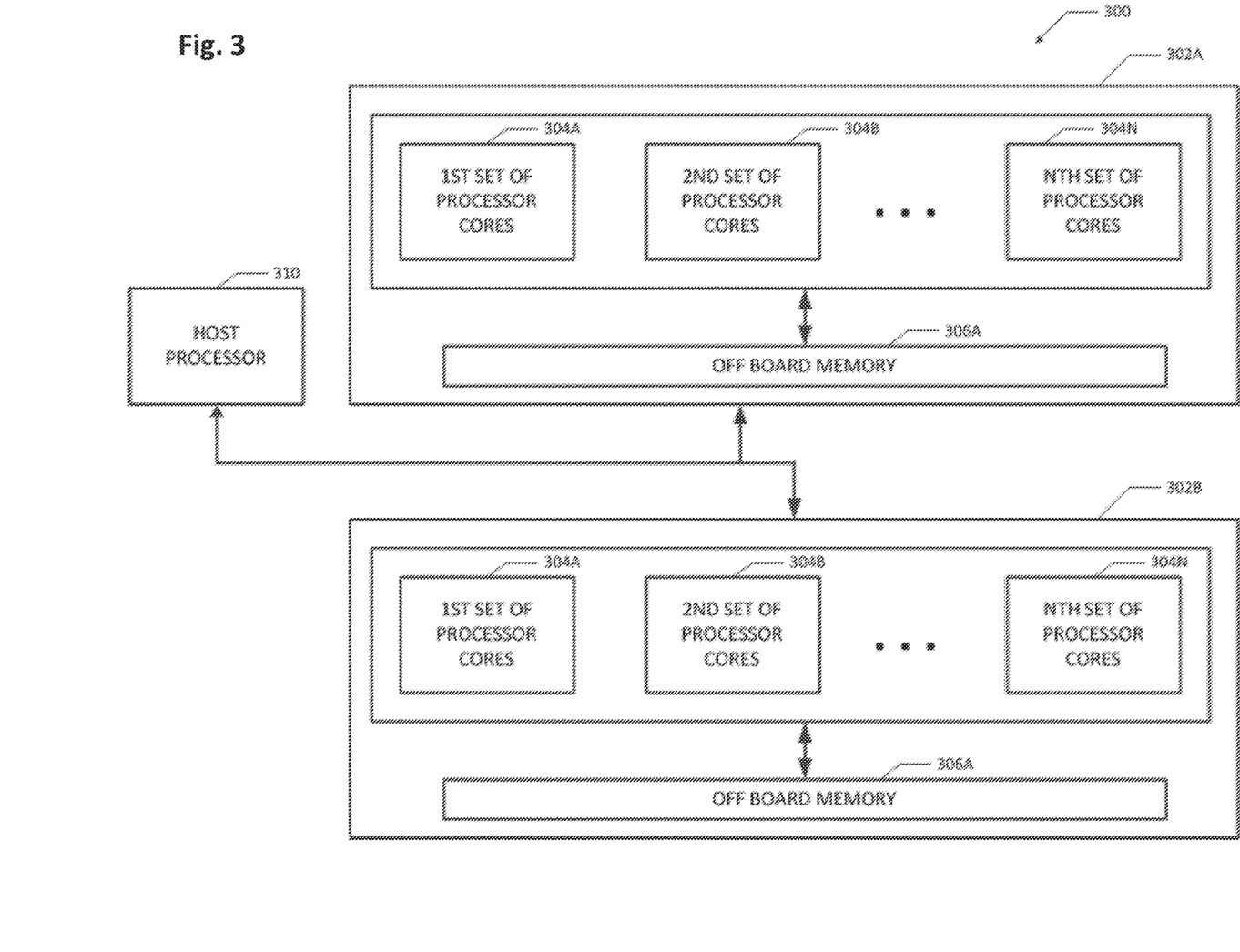
FIG. 3 is a diagram of a computer system for implementing the network systems of FIGS. 1 and 4 and the method of FIG. 3 according to various embodiments of the present invention.

Any feed forward network, including an unrolled recurrent neural network, may be trained using a computer system such as the system illustrated in FIG. 3, using computations called feed forward activation and back propagation of partial derivatives.

In a preferred embodiment, any feed forward neural network, including an unrolled recurrent neural network, may be trained by a well-known iterative parameter update process called stochastic gradient descent. In stochastic gradient descent, the set of training data items is broken into smaller sets called minibatches. An update to the learned parameters is made based on an estimate of the negative of the gradient of the objective computed for each minibatch. The estimate of the gradient for a minibatch is computed by first computing an estimate of the gradient of the objective for each data item in the minibatch, then accumulating those estimates for all data items in the minibatch, and finally for each minibatch computing an update for the learned parameters with an update step in the direction of the negative of the estimated gradient.

For a single data item, the gradient of the objective with respect to all the learned parameters is computed by first computing the activations of the nodes in the network with a feed forward computation as discussed above, and then computing the partial derivatives of the objective by applying the chain rule of calculus proceeding backwards through the network using a computation called "back propagation," which is well-known to those skilled in the art of training neural networks.

FIG. 2 is a flowchart of an illustrative embodiment of the process by which a system such as the one illustrated in FIG. 1 may be trained using a computer system such as the one illustrated in FIG. 3. In Step 201, in the illustrated embodiment, the computer system builds and trains an ensemble of neural networks (e.g., the ensemble members 102A-C in FIG. 1) without joint optimization, or it obtains a pre-trained ensemble. As used herein, "training with joint optimization" comprises optimizing the combined performance on a shared objective such that each of the member networks is modified in a training process that improves the joint performance on the shared objective. Training "without joint optimization," as in step 201, means that the training is performed without such a shared objective.

There are many well-known examples of ensemble building methods that train without joint optimization that could be used at step 201. For example, bootstrap aggregating (also known as "bagging") builds an ensemble by creating diversity among the ensemble members by choosing a separate set of training data examples for each ensemble by random sampling with replacement. Each ensemble member is independently trained to optimize its individual performance on the shared objective. The training of each individual ensemble member does not depend on the training or on the performance of the other ensemble members. Thus, as the phrase is used herein, the ensemble members are trained without joint optimization.

Another example, random subspaces (also called "attribute bagging") randomly chooses a subspace of the input data space for each ensemble member. Each ensemble member is independently trained on data projected to its individual subspace, so again this is an example of training an ensemble without joint optimization.

Another example of an ensemble building method is boosting (also called "hypothesis boosting"), which combines many weak learners (learners that only perform at slightly better than chance) into a strong learner. There are many variants of boosting. Generally, they successively add a new weak learner to an ensemble with the new learner being trained to correct the remaining errors made by the previous ensemble. Thus, each ensemble member is not trained independently of the performance of the previous ensemble members. However, as each new ensemble member is added, only the new member is trained. The existing ensemble members are not modified in this optimization of the new ensemble member. Therefore, this process in not an example of training with joint optimization, as that phrase is used herein. It is instead another example of training without joint optimization.

Any of these examples of training an ensemble "without joint optimization" may be used by the computer system to train the ensemble in Step 201. Furthermore, step 201 is optional in various embodiments. Step 201 illustrates a capability rather than a restriction. Strictly for the purpose of discussion, it distinguishes the first pass through the loop from Step 202 to Step 209 and back to Step 202 from later passes through the loop.

As another illustrative embodiment, in Step 201 the computer system may create an ensemble with an untrained network, initialize the ensemble members and a joint optimization network with random weights, select an initial training data set for each ensemble member by random sampling as in bagging, and then proceed with training with joint optimization. As yet another illustrative embodiment, the ensemble is trained as just described or any other jointly trained ensemble may be used in place of the ensemble "trained without joint optimization" in Step 201. Step 201 also may use an ensemble that has been trained with joint optimization as the pre-trained ensemble mentioned above.

In various embodiments, in Step 202, the computer system implements differences in the training process for different members of the ensemble. As a general tendency, the greater the diversity among the ensemble members the better the performance of the ensemble will be. Preferably, the ensemble building process in Step 201 builds an ensemble with diverse ensemble members. Step 202 supports that diversity in multiple ways, as illustrated by examples 203, 204, and 205, described below. Step 202 also supports further increasing the diversity among the ensemble members by methods illustrated by Steps 208 and 209, also described below.

Blocks 203, 204, and 205 are not steps in the process, but rather represent examples of the kinds of differences allowed by the process of Step 202 and the associated blocks in the diagram of FIG. 1. In preferred embodiments, Step 202 is part of the continued training resulting from the loop from Step 202 to Step 209 back to Step 202, as will be described in more detail below. In some embodiments, Step 202 may also be part of the training process for the initial ensemble building.

In example 203 of Step 202, the computer system allows different ensemble members (e.g., the ensemble members 102A-C) to be trained with different input data sets. Example 203 includes cases in which each data item is multiplied by a weight and the weights are different in different ensemble members. Different subsets may also be represented by multiplying by weights, using weights of zero and one. In effect different weights arise naturally as a side effect of bagging, since some data items may occur multiple times while others do not occur at all. Explicitly weighted data items occur in the initial building of an ensemble in some variants of boosting. Other examples of data selection and data weighting occur in joint optimization training, as discussed in more detail in association with Steps 208 and 209.

Example 203 supports embodiments in which many ensemble members are each trained on a small subset of the available training data items that is disjoint from the set of training data items used in training one or more of the other ensemble members. These members with disjoint training sets facilitate development testing and validation testing in Steps 208 and 209.

On the other hand, in some embodiments, example 203 of Step 202 also supports some ensemble members that have large sets of training data items while other ensemble members have small sets of training data items. Data selection control 106 in FIG. 1 monitors and controls which training data items are used in training each ensemble member.

In example 204 of Step 202, the computer system allows ensemble members (e.g., the ensemble members 102A-C of FIG. 1) to be trained with different objectives. Often all members of an ensemble will have the same objective. However, even when all ensemble members initially have the same objective, the objective of one or more members may be modified in Step 208 or Step 209 and the objectives may differ in later passes through the loop from 202 to 206, 207, 208, and 209. Further, in another aspect of the invention, the process illustrated in FIG. 2 is applied to the more general framework of FIG. 4, in which an arbitrary set of neural networks may be combined. In the system illustrated in FIG. 4, the member networks are not necessarily members of an ensemble and each member network may have a distinct individual objective.

In example 205 of Step 202, the computer system allows different subspaces or transformations of the input for different members of the ensemble (e.g., the ensemble members 102A-C). In some embodiments, such transformations are implemented by the optional blocks 111A, 111B, and 111C in FIG. 1. A special case of example 205 is that ensemble members may each have an input layer that is restricted to a proper subset of the set of input variables. The subset of input variables may be different for different ensemble members. In one preferred embodiment, this special case is implemented simply by having the input blocks 101A, 101B, and 101C have different input data, without requiring the use of transformation blocks 111A, 111B, and 111C.

In Step 206, in the first pass through the loop, the computer system adds joint optimization network 104 to the ensemble member networks, to create the full system illustrated in FIG. 1. In Step 206, the computer system initializes the learned parameters of network 104. In some embodiments, joint optimization network 104 is initialized to mimic a simple ensemble-combining rule. For example, initially joint optimization network 104 may compute the arithmetic or geometric average of the output values computed by the ensemble members 102A-C.

In other embodiments, joint optimization network 104 is initialized as a general purpose neural network with pseudo-random initial weights chosen according to guidelines that are well-known to those skilled in the art of training neural networks with hidden layers. For example, the initial weight for a given directed arc may be chosen from a zero-mean Gaussian distribution with the standard deviation of the weight for the given directed arc being the reciprocal of the square root of the number of directed arcs leading to the same destination node as the given directed arc.

In later passes, in Step 206, the computer system may modify joint optimization network 104. For example, it may modify joint optimization network 104 to accommodate a new ensemble member or other changes made by the computer system. The computer system may also make changes in joint optimization network 104 in Step 208 and 209. For example, in Steps 208 and 209, the computer system may add or delete nodes or arcs to optimization network 104.

In Step 207, the computer system trains the joint optimization network 104 and performs additional training on the ensemble members 102A, 102B, and 102C. In a preferred embodiment, in Step 207, the computer system makes one or more incremental updates to the learned parameters based on stochastic gradient descent with the gradient estimated by accumulating an estimate of the gradient over a minibatch of training data items. In this embodiment, the gradient for each training data item is computed by feed forward activation of the networks and back propagation of the partial derivatives. Stochastic gradient descent and the feed forward and back propagation computations are well-known to hose skilled in the art of training neural networks.

Figure 4:
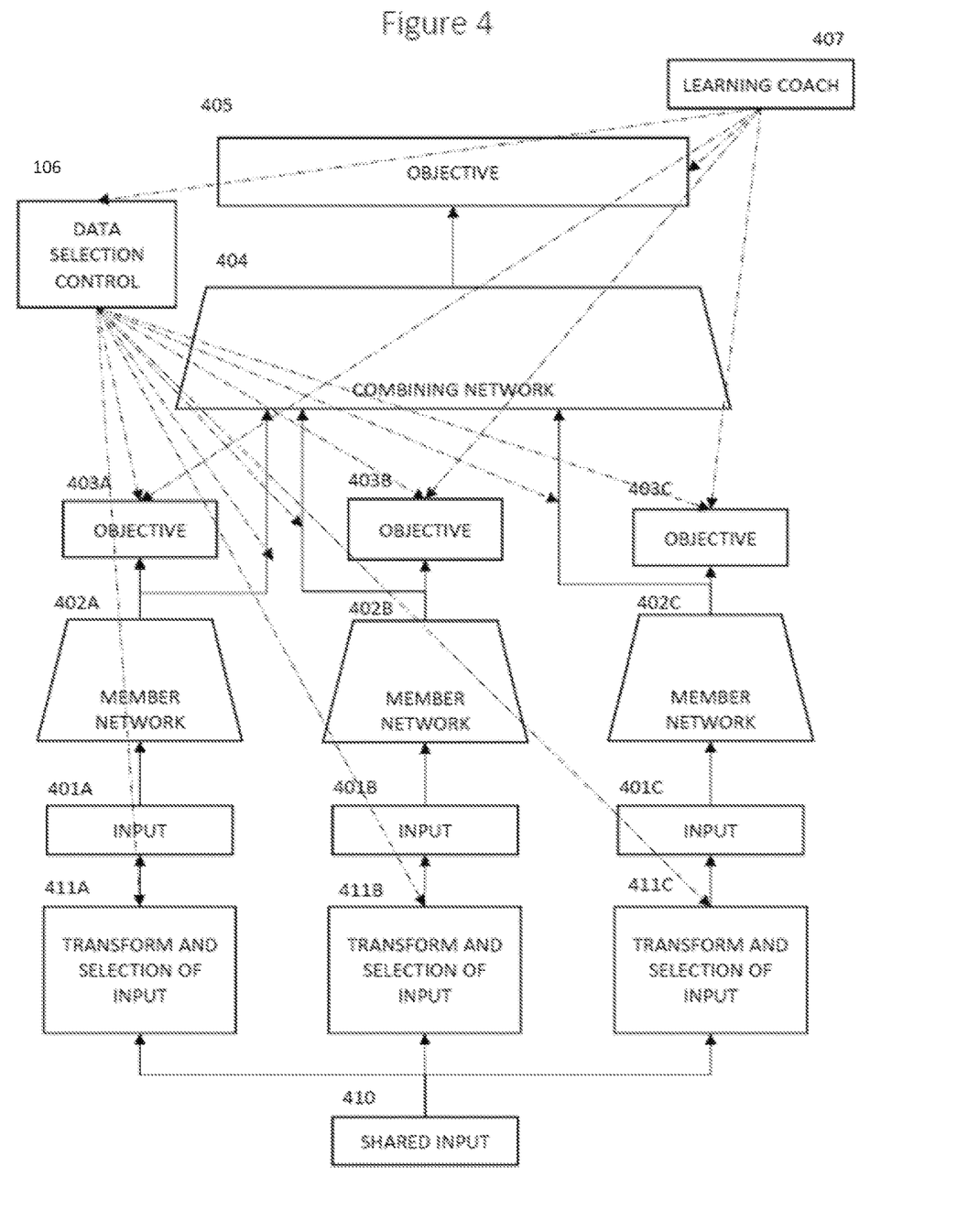

The back propagation computation is modified to integrate the back propagation of joint optimization network 104 with the back propagation of ensemble members 102A, 102B, and 102C. In Step 207, the back propagation computation proceeds backwards from the joint objective 105 through joint optimization network 104 then selectively to each of the ensemble members 102A, 102B, and 102C. The partial derivatives associated with a given training data item are back propagated to an ensemble member only if the given training data item is in the set of training data for the ensemble member as determined in association with example 203 of Step 202. In addition, in Step 207, the computer system back propagates for each ensemble member the partial derivative of the ensemble member's individual objective, such as objective 103B for ensemble member 102B. The partial derivative back propagated through joint optimization network 104 is added to the partial derivative of the ensemble member's individual objective with a relative weight that is determined by a hyperparameter, or that is controlled by a learning coach as shown in FIGS. 1 and 4.

The learning coach is a second, separate machine learning system that learns how to control the learning process of a first machine learning system. In this case, the first machine learning system is the entire system illustrated in FIG. 1 (e.g., the ensemble members 102A-C and the joint optimization network 104), or the system illustrated in FIG. 4 (e.g., the ensemble members 402A-C and the joint optimization network 404). Learning coaches are described in more detail in the following applications, which are incorporated herein by reference in their entirety: PCT Application No. PCT/US17/52037, filed Sep. 18, 2017, entitled "LEARNING COACH FOR MACHINE LEARNING SYSTEM"; and PCT Application No. PCT/US18/20887, filed Mar. 5, 2018, entitled "LEARNING COACH FOR MACHINE LEARNING SYSTEM".

The joint optimization training of the system illustrated in FIG. 1 is not limited to stochastic gradient descent. In Steps 208, the computer system may add one or more additional members to the ensemble or may modify one or more existing ensemble members. In some embodiments such changes or additions may be made under the guidance of a learning coach. For example, modifications may be made to the architecture of an ensemble member by a learning coach, for example, by adding one or more nodes, as described in PCT Application No. PCT/US18/35275, filed May 31, 2018, entitled "ASYNCHRONOUS AGENTS WITH LEARNING COACHES AND STRUCTURALLY MODIFYING DEEP NEURAL NETWORKS WITHOUT PERFORMANCE DEGRADATION"; and provisional application Ser. No. 62/647,085 filed Mar. 23, 2018, entitled "Self Organizing Partially Ordered Networks", which are both incorporated herein by reference in their entirety.

As an example, a node may be added to an ensemble member to implement a process that herein is called "one-shot learning." In one embodiment of one-shot learning, a node, called herein a "template node," is added to a neural network based on a single data item example. In one illustrative embodiment, a template node is a more complex node type that has two learned parameters for each directed arc leading to the node, a weight parameter w(i, j) and an expected value m(i, j). In one illustrative embodiment, its activation function takes the form:

$$A(j,D)=g(\Sigma_k(w(i(j,k),j)*(A(i(j,k),D)-m(i(j,k),j))^2)+b(j)) \quad (5)$$

In a preferred embodiment, once initialized by one-shot learning, the template node continues learning from additional training data items. This continued learning may be done, for example, by stochastic gradient descent. Other learning methods may be used for template nodes, such as the EM algorithm, which is well known to those skilled in the art of statistical estimation of latent variables. A set of template nodes can be trained to model a set of clusters. They may be trained with unsupervised or semi-supervised training, as well as supervised training.

In another embodiment of one-shot learning, a node, called herein a "discrimination node," is added to a neural network. The discrimination node is initialized from a single pair of data items, D1 and D2. In an illustrative embodiment, its activation function is of the form shown in equation (2), where initially the weights and bias are set as:

$$w(i(j,k),j)=A(i(j,k),D2)-A(i(j,k),D1), \text{ and} \quad (6)$$

$$b(j)=\Sigma_k(A(i(j,k),D1)+A(i(j,k),D2)/2. \quad (7)$$

In a preferred embodiment, once initialized by one-shot learning, a discrimination node continues learning from additional training data items. This continued learning may be done, for example, by stochastic gradient descent.

More specialized actions may be taken, such as making an ensemble member more robust against adversarial attacks. For example, anti-adversarial action may be taken as described in PCT Application No. PCT/US18/36916, filed Jun. 11, 2018, entitled "ROBUST ANTI-ADVERSARIAL MACHINE LEARNING", which is incorporated herein by reference in its entirety.

In Step 208, the computer system may change the objective of one or more ensemble members (e.g., ensemble members 102A-C). For example, it may reduce the number of classifications categories by merging two or more categories into a single category. As an alternative example, it may increase the number of categories by splitting a category into clusters trained by unsupervised or semi-supervised learning. In one aspect of the invention, in Step 208, the computer system may merge categories based on an ontology of relations of the form "B is a kind of A," such as "A lion is a kind of animal." In image recognition, an ensemble member may have its objective modified to detect objects or features within a larger image that may be recognized by other ensemble members. Low-level features may be detected by a simple network, such as an edge detector. Higher-level object detectors may detect objects based on a mereology, a hierarchy of relations of the form "X is a part of Y," such as "An eye is part of a face." In Step 208, the computer system may modify the objective of an ensemble member or create a new ensemble member to dedicate as a detector of a lower-level feature or as a detector of an object that is part of a larger object.

In Step 209, the computer system, preferably with the guidance of a learning coach, may change the set of input variables for an ensemble member, may change an input transformation, such as 111B in FIG. 2, or may change the data weights or data selection for an ensemble member. A change in data weighting or data selection may be made as part of a process of adding additional ensemble members, such as the process of data splitting, which is discussed below.

As another example, in Step 209, the computer system may create two new ensemble members from an existing ensemble member. In this example, the computer system selects a node in the existing ensemble member and then divides the set of training data items of the existing ensemble member into two disjoint subsets, using the first subset as the training set for the first new ensemble member and the second subset as the training set for the second new ensemble member. In this example, the first subset is the set of training data items for the existing ensemble member for which the sign of the partial derivative of the objective with respect to the activation value of the selected node is non-negative and the second subset is the set of training date items for the existing ensemble member for which the sign of the partial derivative of the objective with respect to the activation value of the selected node is negative. This process of dividing a set of training data items into two disjoint subsets for training separate networks or for selectively training two separate nodes with a single network is called "data splitting." This example and other examples of using data splitting to create new ensemble members are described in PCT Application No. PCT/US18/35598, filed Jun. 1, 2018, entitled "DATA SPLITTING BY GRADIENT DIRECTION FOR NEURAL NETWORKS," which is incorporated herein by reference in its entirety.

As another example, the weight of a data item may be changed if validation testing shows improved performance with the change. For example, the weight of a data item may be reduced if there is evidence that it is causing over fitting. A data item may effectively be deleted from a set of data items by reducing its weight to zero.

In Steps 208 and 209, the computer system may continue to add new ensemble members, possibly increasing the number of ensemble members to be so large that a distributed computing implementation is preferred. Data selection such as enabled by example 203 of Step 202 and implemented by Step 209 enables and facilitates a form of distributed computing that is described in PCT Application No. PCT/US18/27744, filed Apr. 16, 2018, entitled "MULTI-STAGE MACHINE LEARNING AND RECOGNITION," which is incorporated herein by reference in its entirety.

In addition, in Step 208 and Step 209, the computer system may make changes in an ensemble member based on validation testing using ensemble members trained on disjoint sets of training data items or may make changes in an ensemble member or add additional ensemble members based on data generated by cooperating generators. For example, implementations of validation testing and the use of cooperative generators are described in U.S. provisional application Ser. No. 62/564,754, filed Sep. 28, 2017, entitled "Aggressive Development with Cooperative Generators," which is incorporated herein by reference in its entirety. The ability to do validation testing is facilitated by the data selection and data splitting performed in Steps 208 and 209 because the data selection and data splitting increase the degree to which the respective sets of training data items for different ensemble members are disjoint.

Some preferred embodiments use both validation testing and a type of testing herein called "development testing." In an illustrative example of development testing, the computer system tests whether including or excluding a specific training data item in the training set of a given ensemble member improves or degrades performance of the given ensemble member. Generally, including an additional training data item will improve performance. However, it may degrade performance, for example, if it causes over fitting. To test whether a specific training data item improves or degrades performance, the computer system sets up a two-sided null hypothesis test.

The null hypothesis is that there is no difference in performance between including or excluding the specific training data item. In the illustrative example, the given ensemble member is trained both ways. Then the performance of the two trained versions of the given ensemble members is compared on a plurality of sets of training data items that are disjoint from the training set for the given ensemble member and from the specific training data item. If the difference in performance between the two trained versions of the given ensemble member is statistically significant at a specified significance level, then a conclusion is made as to whether the specific data item improves or degrades performance. If it is concluded that a specific data item degrades performance for a given ensemble member, the specific data item is tested as to whether it degrades performance when included in the training data for other ensemble members. If the null hypothesis is not rejected at the specified level of statistical significance, no conclusion is drawn, but testing may continue if there are more available sets of development test data.

Such null-hypothesis-based development testing may be applied by a learning coach to any decision the learning coach wishes to make about the learning process. Remarkably, there are embodiments of this form of development testing that can be used even when the development test data is unlabeled. Such development testing is herein said to be "unsupervised development testing" or "self-supervised development testing." Such self-supervised development testing is described in more detail in U.S. Pat. No. 8,014,591, issued Sep. 6, 2011, entitled "ROBUST PATTERN RECOGNITION SYSTEM AND METHOD USING SOCRATIC AGENTS."

Preferably, if multiple development tests are conducted with respect to a given ensemble member, then the selection of development test sets is varied from one development test to the next. With repeated development tests using the same development test set, call it "test set T", there is a danger that the system will eventually adapt to the development test set T such that the performance on set T is no longer predictive of the performance that would occur on new data. Other data that has been set aside for validation testing can be used to test the continued viability of development test set T. If development test set T is rejected based on such a validation test, then development test T is never used again. Thereby, development test set T has no chance to adapt to the validation test set used in this test.

The computer system continues through the loop from Step 202 up to Step 209 and back to Step 202 until a stopping criterion is met. For example, the process may be stopped when a performance goal is met, or when in Step 209 the computer determines that a limit has been reached in performance on validation data, or when the number of ensemble members or the number of learned parameters or some other resource-limited attribute has reached a specified limit.

FIG. 3 is a diagram of a computer system 300 that could be used to implement the embodiments described above, such as the networks described in FIGS. 1 and 4 and the method of FIG. 3. The illustrated computer system 300 comprises multiple processor units 302A-B that each comprises, in the illustrated embodiment, multiple (N) sets of processor cores 304A-N. Each processor unit 302A-B may comprise on-board memory (ROM or RAM) (not shown) and off-board memory 306A-B. The on-board memory may comprise primary, volatile and/or non-volatile, storage (e.g., storage directly accessible by the processor cores 304A-N). The off-board memory 306A-B may comprise secondary, non-volatile storage (e.g., storage that is not directly accessible by the processor cores 304A-N), such as ROM, HDDs, SSD, flash, etc. The processor cores 304A-N may be CPU cores, GPU cores and/or AI accelerator cores. GPU cores operate in parallel (e.g., a general-purpose GPU (GPGPU) pipeline) and, hence, can typically process data more efficiently that a collection of CPU cores, but all the cores of a GPU execute the same code at one time. AI accelerators are a class of microprocessor designed to accelerate artificial neural networks. They typically are employed as a co-processor in a device with a host CPU 310 as well. An AI accelerator typically has tens of thousands of matrix multiplier units that operate at lower precision than a CPU core, such as 8-bit precision in an AI accelerator versus 64-bit precision in a CPU core.

In various embodiments, the different processor cores 304 may train and/or implement different networks or subnetworks or components. For example, in one embodiment, the cores of the first processor unit 302A may implement the neural network (e.g., the member networks 102A-C/402A-C and the joint optimization network 104/404) and the second processor unit 302B may implement the learning coach 107/407. For example, the cores of the first processor unit 302A may train the member networks 102A-C/402A-C and the joint optimization network 104/404, and perform the process described in connection with FIG. 2, whereas the cores of the second processor unit 302B may learn, from implementation of the learning coach 107/407, the hyperparameters for the member networks 102A-C/402A-C and the joint optimization network 104/404. Further, different sets of cores in the first processor unit 302A may be responsible for different subnetworks in the neural network or different ensemble members where the neural network comprises an ensemble. For example, the first set of cores 304A may implement the first member network 102A/402B; the second set of cores 304B may implement the second member network 102B/402B; the third set of cores may implement the third member network 102C/402C; and the Nth set of cores 304N may implement the joint optimization member 104/404. In yet other embodiments, there could be a separate processor unit for each ensemble and joint optimization network. For example, the cores of the first processor unit 302A may implement the first member network 102A/402B; the cores of the second processor unit 302B may implement the second member network 102B/402B; the cores of the third processor unit may implement the third member network 102C/402C; the cores of the N−1th processor unit may implement the joint optimization member 104/404; and the cores of the Nth processor unit may implement the learning coach 107/407. One or more host processors 310 may coordinate and control the processor units 302A-B.

In other embodiments, the system 100 could be implemented with one processor unit 302. In embodiments where there are multiple processor units, the processor units could be co-located or distributed. For example, the processor units 302 may be interconnected by data networks, such as a LAN, WAN, the Internet, etc., using suitable wired and/or wireless data communication links. Data may be shared between the various processing units 302 using suitable data links, such as data buses (preferably high-speed data buses) or network links (e.g., Ethernet).

The software for the various compute systems described herein and other computer functions described herein may be implemented in computer software using any suitable computer programming language such as .NET, C, C++, PYTHON®, and using conventional, functional, or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C #, COBOL, Fortran, JAVA®, Lisp, Pascal, Object Pascal, Haskell, ML; and examples of scripting languages include Bourne script, JAVASCRIPT®, PYTHON®, Ruby, LUA®, PHP, and PERL®.

FIG. 4 is a diagram of an illustrative system that is used in various embodiments of another aspect of the invention. The system illustrated in FIG. 4 is similar to the system illustrated in FIG. 1 with several generalizations. Shared input 410, transform and data selection subsystems 411A, 411B, and 411C, and input 401A, 401B, and 401C are each essentially the same as their respective counterparts 110, 111A, 111B, 111C, 101A, 101B, and 101C in FIG. 1. However, networks 402A, 402B, and 402C are arbitrary networks, and objectives 403A, 403B, and 403C may be unrelated to each other. The networks 402A, 402B, and 402C are merely members of a set of networks, not necessarily members of an ensemble. In some embodiments, the networks 402A, 402B, and 402C are components of a system with a joint objective, but unlike an ensemble, the joint objective is not necessarily a shared classification task or regression that each member also has as an individual objective.

In other embodiments, the objective 405 may be an arbitrary specification of a target classification category or regression value for each training data item, not necessarily having any predefined or known relationship to the objectives 403A, 403B, and 403C. The process illustrated in FIG. 2 is applied to the system illustrated in FIG. 4 in the same way it is applied to the system illustrated in FIG. 1. Under the process illustrated in FIG. 2, the objective 405 becomes a de facto joint objective. The member networks 402A, 402B, and 402C are jointly trained to optimize their individual objectives 403A, 403B, 403C combined with the objective 405.

In some embodiments, there may be some known predefined or previously learned relationship among the member networks 402A, 402B, 403C and/or there may be some known predefined or previously learned relationship among the objectives 403A, 403B, 403C, and 405. In some embodiments, there may merely be a hypothesized relationship. In any case, the optimization task remains the same: optimize a specified weighted combination of objectives 405, 402A, 402B, and 402C given a set of training data examples. In applying the process of FIG. 2 to the system illustrated in FIG. 4, Step 201 becomes "Obtain a set of networks" and the phrase "ensemble members" in step 202 becomes "member networks."

When the process of FIG. 2 is applied to the system illustrated in FIG. 4, in step 208, the computer system may create a new network that is called a new ensemble member, in the discussion of FIG. 2. Indeed, in many of the methods used in Step 208 to create a new network, such as data splitting, the new network shares an objective with an existing network or with one or more other new networks such that the set of new networks form an ensemble with each other and possibly with an existing network. Thus, Step 208 may create an ensemble from what was originally a single network in the set of networks obtained in Step 201. This ensemble forms a subset within the expanded set of networks. If Step 209 creates or expands such an ensemble by data splitting, that facilitates development testing and validation testing as described in the discussion of FIG. 2.

As another aspect of the invention, Step 208 when applied to an ensemble as illustrated in FIG. 1 may change the objectives of some of the ensemble members such that in further passes through the loop from Step 202 to Step 209, the system being processed by the process illustrated in FIG. 2 becomes more like an example of FIG. 4 than an example of FIG. 1.

Various embodiments of this invention are intended to work with very large ensembles. In the joint optimization process, each member network benefits from each of the other member networks. Compared to other ensemble building techniques, it is preferable to have a larger number of member networks in some embodiments of the invention disclosed herein than in other techniques.

With many methods of ensemble building, the number of ensemble members is limited in practice because the incremental improvement for each added ensemble member declines and a larger ensemble is inefficient. In an aspect of this invention, learning coaches 107 are 407 themselves machine learning systems and they may be trained to optimize an objective that is different from the objective for the systems of FIG. 1 or FIG. 4, respectively. For example, a learning coach may be trained to optimize an objective that is combination of minimizing error rate on development test data and a measure of computational cost. Such a learning coach can maintain the efficiency of an ensemble to a greater number of ensemble members than could be achieved without such learning coach optimization.

As another aspect of the invention, data selection, as controlled by block 106 in FIG. 1 and used in Step 209 of FIG. 2 can be used to reduce the amount of computation substantially. For example, a multi-stage system such as mentioned above not only facilitates distributed computing, it also allows a very large set of data items to be distributed among a large set of specialized networks. In operation, as well as during training, each specialized network only processes a small fraction of the data. The set of specialized networks can work on multiple tasks simultaneously, reducing the amount of computation per task by an order of magnitude or more. This aspect of the invention increases the number of ensemble members for a given computational cost, and the data selection in such a multi-stage system also reduces the amount of training data for each member network or ensemble member. In Step 209, the computing system can use such data selection even without a multi-stage system.

In some embodiments, it is also may be preferred to use fewer training data examples for an ensemble member or member network. Fewer training data examples for an individual ensemble member produces greater diversity among the ensemble members, but at the cost of greater bias and variance in the performance of that individual ensemble member or member network. However, the joint optimization of the ensemble or set of networks is better able to compensate for greater bias in individual members than are other techniques. Furthermore, the use of development testing and validation testing in Steps 208 and 209 enhances the general ability of ensembles to reduce the variance compared to single networks or smaller ensembles. Thus, the optimum trade-off in setting the number of training data items for an individual member network is a smaller number than might be optimum for other methods of ensemble building.

The properties of: (1) having more member networks, and (2) having relatively fewer training data items per member network, reinforce each other. These properties also increase the ability of other members of the set of networks to do development testing and validation testing of each member of the set of networks.

Based on the above description, it is clear that embodiments of the present invention can be used to improve many different types of machine learning systems, particularly neural networks and ensembles of neural networks, in a variety of applications. For example, embodiments of the present invention can improve recommender systems, speech recognition systems, and classification systems, including image and diagnostic classification systems, to name but a few examples.

In one general aspect, therefore, the present invention is directed to computer-implemented, machine-learning systems and methods for training a combination machine-learning system that comprises N>1 neural networks (e.g., ensemble members 102A-C) and a machine-learning joint optimization network 104. The method comprises, according to various embodiments, training, with the computer system 300 that comprises a set of processor cores 304A-N, through machine-learning, the combination machine-learning system, where an output of each of the N neural networks is input to the joint optimization network. Each of the N machine-learning system has a primary objective for that machine-learning system and the joint optimization network has a joint optimization objective. Further, training the combination machine-learning system comprises training each of the N neural networks jointly with both (i) the primary objective for that machine-learning system and (ii) the joint optimization objective from the joint optimization network.

A computer system 300 according to a general aspect of the present invention comprises a set of processor cores 304A-N and computer memory (e.g, on-board of off-board memory 306) that is in communication with the set of processor cores. The computer memory stores software that when executed by the set of processor cores, causes the set of processor cores to train through machine-learning the combination machine-learning system, such that each of the N neural networks is trained jointly with both (i) the primary objective for that machine-learning system and (ii) the joint optimization objective from the joint optimization network. The computer system of claim 25, wherein the computer memory stores software that causes the set of processor cores to train each of the N neural networks by training each of the N neural networks using stochastic gradient descent that comprises simultaneously back-propagating through each of N neural networks partial derivatives for both (i) the primary objective for that machine-learning system and (ii) the joint optimization objective from the joint optimization network.

In various implementations, each of the N-machine learning systems has a corresponding set of training examples such that each of the N-machine learning systems are trained only with training examples from its corresponding set of training examples, in which case the computer memory can store software that causes the set of processor cores to train each of the N neural networks by, for each training example, back-propagating partial derivatives for the joint optimization objective from the joint optimization network only to the one of the N machine-learning system that was trained on the training example. Also, the computer memory may further store software that causes the set of processor cores to simultaneously back-propagate through each of N neural networks the partial derivatives for both (i) the primary objective for that machine-learning system and (ii) the joint optimization objective from the joint optimization network by adding a weighted partial derivative for the joint optimization objective to the primary objective for that machine-learning system.

In various implementations, the joint optimization objective of the joint optimization network is different from the primary objective of each of the N neural networks. Also, each of the N neural networks may have a different primary objective. Still further, the N neural networks may be individual ensemble members of an ensemble. In such circumstances, the computer memory may store software that causes the set of processor cores to, prior to training the combination machine-learning system, pre-train the ensemble without a joint optimization objective. Also, the computer memory may store software that causes the set of processor cores to pre-train the ensemble by pre-training the ensemble such that at least two of the N neural networks have different primary objectives. The pre-training may be by bootstrap aggregation, attribute bagging, and hypothesis bagging.

Additionally, in any of the above described implementations, at least two of the N ensemble members have different input variables.

In various implementations, the computer memory stores software that causes the set of processor cores to generate the set of training examples for each of the N neural networks by transforming a set of shared of training examples into N sets of transformed training examples, such that each of the N machine-learning system is trained with a unique one of the N sets of transformed training examples. At least two of the N sets of transformed training examples may be disjoint. Also, the computer memory may store software that causes the set of processor cores to, prior to training the combination machine-learning system, pre-train the N neural networks without a joint optimization objective.

In various implementations, the computer memory stores software that causes the set of processor cores to modify the joint optimization network after the training of the combined machine-learning system and then re-train the combined machine-learning system with the modified joint optimization network. Also, the computer memory may store software that causes the set of processor cores to modify the set of N neural networks (e.g., ensemble members 102A-C) after the training of the combined machine-learning system and then re-train the combined machine-learning system with the modified set of machine learning system, recursively until a stopping criterion is met. The modification of the set of N neural networks may comprise modifying at least one of the N neural networks, such as by adding a node to the at least one of the N neural networks, deleting a node from the at least one of the N neural networks, adding an arc from the at least one of the N neural networks, and/or deleting an arc from the at least one of the N neural networks. Where a node is added, the node could be a template node or a discrimination node, for example. Also, the modification of the set of N neural networks could comprise an additional machine learning system, or changing the primary objecting of at least one of the N neural networks, or changing the input variables for at least one of the N neural networks The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A computer-implemented method comprising: pre-training, with a computer system that comprises a set of processor cores, through machine-learning, a set of N neural networks, where N is greater than 1, wherein pre-training the N neural networks comprises pre-training the N neural networks to be diverse from each other and wherein each of the N neural networks has a primary objective;
    after pre-training the set N neural networks, adding, by the computer system, a machine-learning joint optimization network to the set of neural networks to thereby create a combination machine-learning system, wherein:
    the combination machine-learning system comprises the set of N neural networks, and the machine-learning joint optimization network, such that an output of each of the N neural networks is input to the machine-learning joint optimization network; the machine-learning joint optimization network has a joint optimization objective;
    and the joint optimization network is trained, through machine learning, based on the joint optimization objective, to produce a joint optimization output from the outputs from each of the N neural networks; and
    after adding the machine-learning joint optimization network, training, by the computer system, the combination machine-learning system using stochastic gradient descent, wherein training the combination machine-learning system comprises back-propagating partial derivatives from the joint optimization output, through the joint optimization network, and to each of the N neural networks: and
    back-propagating simultaneously through each of the N neural networks partial derivatives for both (i) the primary objective for the neural network and (ii) the joint optimization objective from the machine-learning joint optimization network, such that each of the N neural networks are trained to minimize errors jointly relative to the joint optimization objective and the primary objective for the neural network, such that diversity of the N neural networks increases from one neural network to another in performance of their machine learning tasks.

2. The computer-implemented method of claim 1, wherein:
    each of the N neural networks has a corresponding set of training examples such that each of the N neural networks is trained only with training examples from its corresponding set of training examples; and
    training the combination machine learning system comprises training each of the N neural networks by, for each training example, back-propagating partial derivatives for the joint optimization objective from the machine-learning joint optimization network only to the one of the N neural networks that was trained on the training example.

3. The computer-implemented method of claim 2, wherein simultaneously back-propagating through each of N neural networks the partial derivatives for both (i) the primary objective for that neural network and (ii) the joint optimization objective from the machine-learning joint optimization network comprises adding a weighted partial derivative for the joint optimization objective to the primary objective for that neural network.

4. The computer-implemented method of claim 2, wherein the joint optimization objective of the machine-learning joint optimization network is different from the primary objective of each of the N neural networks.

5. The computer-implemented method of claim 2, wherein each of the N neural networks has a different primary objective.

6. The computer-implemented method of claim 2, wherein the N neural networks are individual ensemble members of an ensemble.

7. The computer-implemented method of claim 6, wherein pre-training the set of N neural networks comprising pre-training, with the computer system, the ensemble without a joint optimization objective.

8. The computer-implemented method of claim 6, wherein pre-training the ensemble comprises pre-training the ensemble such that at least two of the N neural networks have different primary objectives.

9. The computer-implemented method of claim 6, wherein pre-training the ensemble comprises pre-training the ensemble with an ensemble building technique selected from the group consisting of bootstrap aggregation, attribute bagging, and hypothesis bagging.

10. The computer-implemented method of claim 6, wherein at least two of the N ensemble members have different input variables.

11. The computer-implemented method of claim 1, wherein at least two of the N neural networks have different input variables.

12. The computer-implemented method of claim 2, further comprising generating, by the computer system, the set of training examples for each of the N neural networks by transforming a set of shared training examples into N sets of transformed training examples, such that each of the N neural networks is trained with a unique one of the N sets of transformed training examples.

13. The computer-implemented method of claim 12, wherein at least two of the N sets of transformed training examples are disjoint.

14. The computer-implemented method of claim 2, wherein pre-training comprises pre-training, with the computer system, the N neural networks without a joint optimization objective.

15. The computer-implemented method of claim 2, further comprising:
modifying, by the computer system, the joint optimization network after the training of the combination machine-learning system; and
re-training the combination machine-learning system with the modified joint optimization network.

16. The computer-implemented method of claim 15, further comprising:
modifying, by the computer system, the set of N neural networks after the training of the combination machine-learning system; and
re-training the combination machine-learning system with the modified set of N neural networks, wherein the modifying and re-training are performed recursively until a stopping criterion is met.

17. The computer-implemented method of claim 2, further comprising:
modifying, by the computer system, the set of N neural networks after the training of the combination machine-learning system; and
re-training the combination machine-learning system with the modified set of N neural networks, wherein the modifying and re-training are performed recursively until a stopping criterion is met.

18. The computer-implemented method of claim 16, wherein modifying the set of N neural networks comprises modifying at least one of the N neural networks.

19. The computer-implemented method of claim 18, wherein modifying at least one of the N neural networks comprises a modification selected from the group consisting of:
adding a node to the at least one of the N neural networks;
deleting a node from the at least one of the N neural networks;
adding an arc to the at least one of the N neural networks; and
deleting an arc from the at least one of the N neural networks.

20. The computer-implemented method of claim 18, wherein modifying at one of the N neural networks comprises adding a node to the at least one of the N neural networks, wherein the node is a node type selecting from the group consisting of:
a template node; and
a discrimination node.

21. The computer-implemented method of claim 16, wherein modifying the set of N neural networks comprises adding a neural network to the set of neural networks.

22. The computer-implemented method of claim 16, wherein modifying the set of N neural networks comprises changing the primary objective of at least one of the N neural networks.

23. The computer-implemented method of claim 16, wherein modifying the set of N neural networks comprises changing input variables for at least one of the N neural networks.

24. A computer system comprising: a set of processor cores; and computer memory in communication with the set of processor cores, wherein the computer memory stores software that when executed by the set of processor cores, causes the set of processor cores to:
pre-train through machine-learning a set of N neural networks, where N is greater than 1, wherein training the N neural networks comprises training the N neural networks to be diverse from each other and wherein each of the N neural networks has a primary objective;
after pie-training the set of N neural networks, adding, by the computer system, a machine-learning joint optimization network to the set of neural networks to thereby create a combination machine-learning system, wherein:
the combination machine-learning system comprises the set of N neural networks, and the machine-learning joint optimization network, such that an output of each of the N neural networks is input to the machine-learning joint optimization network; the machine-learning joint optimization network has a joint optimization objective; and the joint optimization network is trained, through machine learning, based on the joint optimization objective, to produce a joint optimization output from the outputs from each of the N neural networks; and after adding the machine-learning joint optimization network, train the combination machine-learning system using stochastic gradient descent, wherein training the combination machine-learning system comprises:

back-propagating partial derivatives from the joint optimization output, through the joint optimization network, and to each of the N neural networks; and simultaneously back-propagating through each of the N neural networks partial derivatives for both (i) the primary objective for the neural network and (ii) the joint optimization objective from the machine-learning joint optimization network, such that each of the N neural networks are trained to minimize errors jointly relative to the joint optimization objective and the primary objective for the neural network, such that diversity of the N neural networks increases from one neural network to another in performance of their machine learning tasks.

25. The computer system of claim 24, wherein:

each of the neural networks has a corresponding set of training examples such that each of the neural networks is trained only with training examples from its corresponding set of training examples; and the computer memory stores software that causes the set of processor cores to train each of the N neural networks by, for each training example, back-propagating partial derivatives for the joint optimization objective from the joint optimization network only to the one of the N neural networks that was trained on the training example.

26. The computer system of claim 25, wherein the computer memory stores software that causes the set of processor cores to simultaneously back-propagate through each of N neural networks the partial derivatives for both (i) the primary objective for the neural network and (ii) the joint optimization objective from the machine-learning joint optimization network by adding a weighted partial derivative for the joint optimization objective to the primary objective for the neural network.

27. The computer system of claim 25, wherein the joint optimization objective of the machine-learning joint optimization network is different from the primary objective of each of the N neural networks.

28. The computer system of claim 25, wherein each of the N neural networks has a different primary objective.

29. The computer system of claim 25, wherein the N neural networks are individual ensemble members of an ensemble.

30. The computer system of claim 29, wherein the computer memory stores software that causes the set of processor cores to pre-train the ensemble without a joint optimization objective.

31. The computer system of claim 29, wherein the computer memory stores software that causes the set of processor cores to pre-train the ensemble by pre-training the ensemble such that at least two of the N neural networks have different primary objectives.

32. The computer system of claim 29, wherein the computer memory stores software that causes the set of processor cores to pre-train the ensemble by pre-training the ensemble with an ensemble building technique selected from the group consisting of bootstrap aggregation, attribute bagging, and hypothesis bagging.

33. The computer system of claim 29, wherein at least two of the N ensemble members have different input variables.

34. The computer system of claim 24, wherein at least two of the N neural networks have different input variables.

35. The computer system of claim 25, wherein the computer memory stores software that causes the set of processor cores to generate the set of training examples for each of the N neural networks by transforming a set of shared training examples into N sets of transformed training examples, such that each of the N neural networks is trained with a unique one of the N sets of transformed training examples.

36. The computer system of claim 35, wherein at least two of the N sets of transformed training examples are disjoint.

37. The computer system of claim 25, wherein the computer memory stores software that causes the set of processor cores to pre-train the N neural networks without a joint optimization objective.

38. The computer system of claim 25, wherein the computer memory stores software that causes the set of processor cores to:

modify the joint optimization network after the training of the combination machine-learning system; and re-train the combination machine-learning system with the modified joint optimization network.

39. The computer system of claim 38, wherein the computer memory stores software that causes the set of processor cores to:

modify the set of N neural networks after the training of the combination machine-learning system; and re-train the combination machine-learning system with the modified set of N neural networks, wherein the modifying and re-training are performed recursively until a stopping criterion is met.

40. The computer system of claim 25, wherein the computer memory stores software that causes the set of processor cores to:

modify the set of N neural networks after the training of the combination machine-learning system; and re-train the combination machine-learning system with the modified set of N neural networks, wherein the modifying and re-training are performed recursively until a stopping criterion is met.

41. The computer system of claim 39, wherein the computer memory stores software that causes the set of processor cores to modify the set of N neural networks by modifying at least one of the N neural networks.

42. The computer system of claim 41, wherein the computer memory stores software that causes the set of processor cores to modify at least one of the N neural networks by a modification selected from the group consisting of:

adding a node to the at least one of the N neural networks;

deleting a node from the at least one of the N neural networks;

adding an arc to the at least one of the N neural networks; and deleting an arc from the at least one of the N neural networks.

43. The computer system of claim 41, wherein the computer memory stores software that causes the set of processor cores to modify at least one of the N neural networks by adding a node to the at least one of the N neural networks, wherein the node is a node type selecting from the group consisting of:

a template node;

a discrimination node.

44. The computer system of claim 39, wherein the computer memory stores software that causes the set of processor cores to modify the set of N neural networks by adding a neural network to the set of N neural networks.

45. The computer system of claim 39, wherein the computer memory stores software that causes the set of processor cores to modify the set of N neural networks by changing the primary objecting of at least one of the N neural networks.

46. The computer system of claim 39, wherein the computer memory stores software that causes the set of processor cores to modify the set of N neural networks by changing input variables for at least one of the N neural networks.

47. The computer-implemented method of claim 1, wherein training the combination machine-learning system to be more diverse comprises:
   modifying, by the computer system, the primary objective of at least one of the N neural networks to improve diversity among the N neural networks; and
   after modifying the primary objective of the at least one of the N neural networks, retraining, by the computer system, the combination machine-learning system.

48. The computer system of claim 24, wherein the computer memory stores software that causes the set of processor cores to train the combination machine-learning system to be more diverse by:
   modifying the primary objective of at least one of the N neural networks to improve diversity among the N neural networks; and
   after modifying the primary objective of the at least one of the N neural networks, retraining the combination machine-learning system.

\* \* \* \* \*